Feb. 18, 1941.   J. VON BRETHORST   2,232,039
SHAFT SEAL DEVICE
Filed Dec. 19, 1938
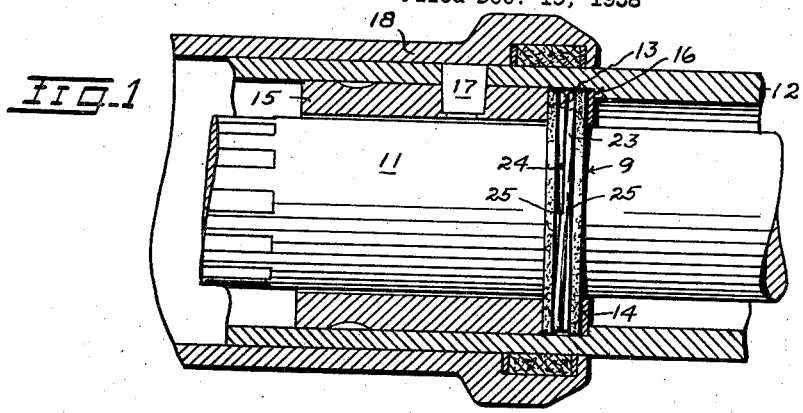
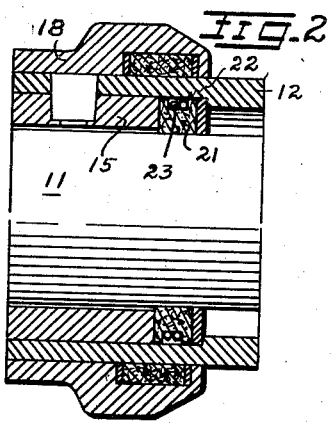
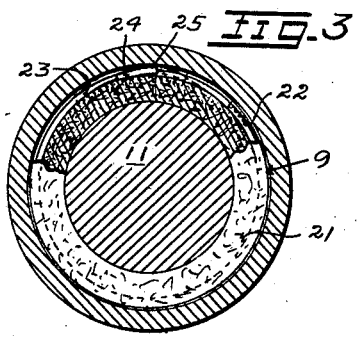
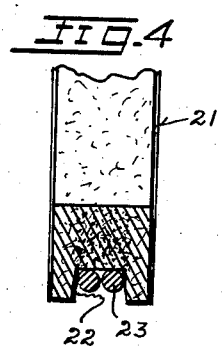
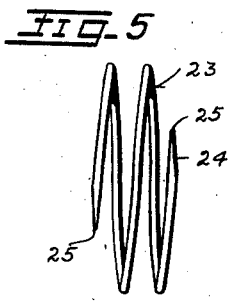
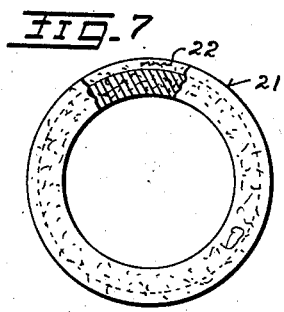
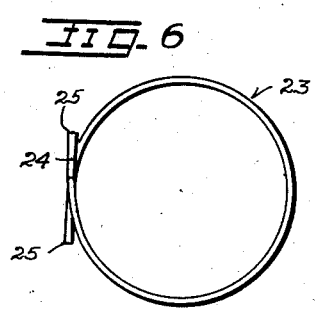
INVENTOR:
BY  JOERGEN VON BRETHORST
Henry N. Young
ATTORNEY.

Patented Feb. 18, 1941

2,232,039

UNITED STATES PATENT OFFICE 2,232,039

SHAFT SEAL DEVICE

Joergen Von Brethorst, Oakland, Calif.

Application December 19, 1938, Serial No. 246,633

4 Claims. (Cl. 286—7)

The invention relates to a means for providing a liquid-sealing dam between a rotary shaft and an enclosing sleeve for preventing the passage of liquid in the sleeve along the shaft through the sealing point.

An object of the invention is to provide a sealing ring assembly which is arranged for its provision and operative installation as a unit.

Another object is to provide an improved sealing ring which radially grips a shaft in its bore while providing a seal axially thereof at its rim portion.

A further object is to provide a sealing ring unit which provides a means for securing it against rotation with respect to the sleeve with which it is coactive.

The invention possesses other objects and features of advantage, some of which, with the foregoing, will be set forth or be apparent in the following description of a typical embodiment thereof, and in the accompanying drawing, in which, Figure 1 is an elevation showing a sealing ring embodying the invention operatively engaged between a shaft and an enclosing sleeve, the sleeve being shown in longitudinal axial section.

Figure 2 is a fragmentary view showing the assembly of Figure 1, but with the sealing ring also shown in axial section.

Figure 3 is a transverse section of the sleeve and shaft assembly taken at a sealing ring which is shown partially in transverse section.

Figure 4 is an enlarged fragmentary and radial section of the unmounted sealing ring assembly.

Figures 5 and 6 are side and end views of a spring element of the ring assembly removed from a washer element thereof.

Figure 7 is an end view of the washer element of the sealing unit, a portion of the washer element being broken out to disclose the peripheral groove therein for receiving the spring element.

For purposes of illustration, the unitary sealing ring assembly 9 of my invention is disclosed in Figures 1 to 3 as being operatively installed for sealing the space between a rotary shaft 11 and a tubular sleeve 12 enclosing the shaft with its cylindrical bore coaxial with the shaft. An annular channel 13 of uniform cross-section is defined about the shaft 11 for use as a stuffing box to receive the sealing ring 9 of my invention in such manner that different ring portions are forcibly pressed against the shaft periphery and the sides of the channel 13 to cross-seal or dam the sleeve space thereat. In the present instance, the channel 13 is defined between a gland ring 14 and a bushing 15 closely fitting the sleeve bore and encircling the shaft in mutually spaced relation at opposite ends of a sleeve bore portion which defines the channel bottom.

As shown, the sleeve bore is stepped at a shoulder 16 for receiving the gland ring 14 against said shoulder, and a removable locking member 17 engages registering perforations in the sleeve and the bushing 15 for securing the bushing in fixed relation to the shoulder 16 and so to the operative gland ring 14. The sleeve bore portion which receives the bearing 15 is arranged to contain a lubricant or other liquid, and the present sealing ring is designed to prevent the escape of the liquid through and beyond it. As indicated, the sleeve 12 extends from a housing 18 which sealedly receives it while securing the locking member 18 in place. The space for liquid may enclose a universal joint or some other mechanism or device which operates in liquid, its exact utility being generally immaterial to the present invention. Also, the bushing 15 may provide a shaft bearing or function solely for providing one side of the channel 13.

It will now be noted that the sealing unit 9 comprises a washer member 21 which is preferably formed of a piece of sole leather, though some other fibrous and homogeneous composition having substantially the same flexibility and compressibility and resistance to liquid action as sole leather may be utilized. The washer 21 is a right cylinder in outline, has its bore arranged to closely receive the shaft 11, and is provided with a peripheral groove 22 of uniform rectangular cross-section which is equally spaced from its flat end faces. In practice, it has been found best to cut the groove 22 in a flat ring of leather whereby the density of the washer material is not effected in providing the groove. The sealing unit is completed by the installation of an helical spring member 23 in the washer groove 22, said spring being operative to effect certain compressive and distortion effects on the washer 21, as is hereinafter brought out.

The conformation of the spring 23 before its installation in the washer groove 22 is disclosed in Figures 5 and 6. The spring 23 preferably comprises at least two full turns of spring wire which are normally spaced axially of the spring and define a helix of uniform size having a bore diameter slightly less than the diameter of the bottom of the peripheral washer groove 22. The free end portions 24 of the spring are tapered to provide flattened extremities having their planes transverse to the spring axis, the tapering preferably being effected from the outer faces of the spring ends whereby the installed spring may provide a uniform urge to axial expansion of the washer opposite the groove 22. The spring portions 24 normally extend tangentially from the cylinder of the spring, and are preferably tempered, or otherwise hardened, whereby at least their outer corners 25 may be harder than the material of the sleeve 12.

It will now be noted that when the spring 23 is mounted on a free washer 21, the latter is operative to circumferentially expand the spring while the spring reacts to contract the washer bore and thicken the washer opposite the groove 22. When the assembled unit is installed in the channel 13 and is mounted on the shaft 11, the aforesaid spring reactions with the washer are operative to sealedly engage the washer bore with the shaft while permitting the shaft rotation, and to sealedly press the end faces of the washer against the gland ring 14 and the opposed end of the bushing 15 to complete the desired liquid seal between the shaft and sleeve. It will, of course, be understood that the normal thickness of the washer 21 should be approximately equal to the width of the channel 13 to provide for the desired axial sealing with the opposed gland ring and bushing end faces.

When the shaft 11 rotates in the washer bore in frictionally sealed engagement therewith, it urges an undesirable rotation of the washer with the shaft and with respect to the sleeve, and the relatively hard spring points 25 extending beyond the cylinder of the washer and resiliently bearing against the sleeve bore portion at the channel 13 are arranged for operation to prevent such rotation of the sealing unit with respect to the sleeve by reason of their oblique and slightly penetrative engagement with the material of the sleeve bore. In this manner, the sealing unit is arranged to be held against rotation with the shaft in either possible direction of rotation of the latter, as is required for shafts or axles of vehicles, for instance. Since the present sealing ring unit 9 is not utilized to provide a seal peripherally thereof, the sleeve bore need not be provided with a finished surface at the sealing point. Also, the length of wire in the spring 23 is preferably such that the mounted spring presents the spring end points 25 in substantially the same axial line of the cylinder bore, whereby to insure a full lateral seal by the washer.

In view of the foregoing, it will be understood that the present two-element sealing unit provides a radial seal at a rotary shaft engaged in its bore, an axial seal with the sides of the sleeve channel or stuffing box 13 which receives it, and a self-contained means which is constantly operative to prevent a rotation of the unit with the shaft, whereby to accomplish the major objectives of the invention in a particularly simple and effective manner. While I have described the features and principles of operation of a structure which I now consider to represent a preferred embodiment of my invention, I desire to have it understood that the present showing is primarily illustrative, and that such changes may be made, when desired, as fall within the scope of the following claims.

1. In a sealing ring for a rotary shaft, a cylindric washer of flexible and compressible material provided with an annular peripheral groove coaxial therewith, and an helical spring of cylindrical outline having at least two full turns engaged in said groove in coaxial relation with the washer and constantly operative to urge a sealing contraction of the washer about a shaft which is engaged through the washer bore and having its extremities sharpened and extending tangentially from the cylinders of its turns and of the washer.

2. In combination with a cylindrical shaft portion and an enclosing sleeve having a cylindrical bore coaxial with the shaft and spaced therefrom, said shaft and sleeve being arranged for their relative rotation, means within the sleeve cooperative with the sleeve bore to define a channel of rectangular cross-section facing the shaft, a sealing washer of flexible and compressible material fittedly engaged in said channel to receive the shaft through its bore and provided with an annular peripheral groove coaxial therewith, and an helical spring having a sharpened extremity and disposed in said groove in coaxial relation with the washer and constantly operative to contract the washer about the shaft in sealing engagement therewith while presenting the point of said sharpened extremity thereof directly against the sleeve bore in the channel to secure the spring and washer against rotation with respect to the sleeve.

3. In combination with a cylindrical shaft and an enclosing sleeve having a cylindrical bore coaxial with the shaft in spaced relation thereto, said shaft and sleeve being arranged for their relative rotation, means within the sleeve cooperative with the sleeve bore to define an annular channel having between the sleeve and shaft, a sealing washer of flexible and compressible material fittedly engaged in said channel to receive the shaft through its bore and provided with an annular peripheral groove of uniform cross-section, and an helical spring having a plurality of turns disposed in said groove and constantly operative to axially expand the washer opposite the groove in positive sealing engagement with the channel sides while radially contracting the washer for the sealing engagement of its bore with the shaft, and means on the spring constantly coactive with the sleeve to prevent a rotary movement of the spring and washer with respect to the sleeve and comprising sharpened spring extremities resiliently and obliquely bearing against the sleeve bore at the bottom of the channel.

4. In a sealing ring for a shaft, a cylindric washer of flexible and compressible material, and a helical spring of cylindrical outline having a plurality of turns engaged peripherally about the washer in coaxial relation with the washer and constantly operative to urge a sealing contraction of the washer about a shaft which is rotatively engaged through the washer bore and having an extremity sharpened and extending tangentially from the cylinder of its turns and of the washer.

JOERGEN VON BRETHORST.